(12) United States Patent
Oka et al.

(10) Patent No.: US 7,634,110 B2
(45) Date of Patent: Dec. 15, 2009

(54) DRIVE ASSIST SYSTEM AND NAVIGATION SYSTEM FOR VEHICLE

(75) Inventors: Hajime Oka, Yokkaichi (JP); Motoharu Esaki, Obu (JP)

(73) Assignee: DENSO CORPORATION, Kariya (JP)

( * ) Notice: Subject to any disclaimer, the term of this patent is extended or adjusted under 35 U.S.C. 154(b) by 689 days.

(21) Appl. No.: 11/362,823

(22) Filed: Feb. 28, 2006

(65) Prior Publication Data

US 2006/0210114 A1 Sep. 21, 2006

(30) Foreign Application Priority Data

Mar. 2, 2005 (JP) ............................. 2005-057755

(51) Int. Cl.
*G06K 9/00* (2006.01)
(52) U.S. Cl. .................... 382/104; 701/208; 348/148
(58) Field of Classification Search .............. 382/100, 382/103, 104, 105, 106; 701/1, 10, 22, 23, 701/24, 25, 26, 28, 200, 205, 207, 208, 209, 701/210, 214; 348/142, 143, 148, 149
See application file for complete search history.

(56) References Cited

U.S. PATENT DOCUMENTS

| | | | | |
|---|---|---|---|---|
| 6,526,352 | B1* | 2/2003 | Breed et al. ................. | 701/213 |
| 6,593,960 | B1* | 7/2003 | Sugimoto et al. ........... | 348/148 |
| 6,594,583 | B2* | 7/2003 | Ogura et al. ................ | 701/301 |
| 6,678,614 | B2* | 1/2004 | McCarthy et al. ........... | 701/213 |
| 6,882,287 | B2* | 4/2005 | Schofield .................... | 340/903 |
| 7,253,833 | B2* | 8/2007 | Imoto ......................... | 348/148 |
| 2003/0191583 | A1* | 10/2003 | Uhlmann et al. ............ | 701/208 |
| 2005/0174429 | A1* | 8/2005 | Yanai ......................... | 348/148 |
| 2005/0240342 | A1* | 10/2005 | Ishihara et al. .............. | 701/208 |
| 2007/0055441 | A1* | 3/2007 | Retterath et al. ............ | 701/200 |

FOREIGN PATENT DOCUMENTS

| | | |
|---|---|---|
| JP | A-05-278522 | 10/1993 |
| JP | A-09-35196 | 2/1997 |
| JP | A-09-058343 | 3/1997 |
| JP | A-09-83999 | 3/1997 |
| JP | A-10-262240 | 9/1998 |
| JP | A-10-264722 | 10/1998 |
| JP | A0935196 | * 10/1998 |
| JP | A-2001-116567 | 4/2001 |
| JP | A-2002-109696 | 4/2002 |
| JP | A-2002-283912 | 10/2002 |
| JP | A-2003-127772 | 5/2003 |
| JP | A-2004-51063 | 2/2004 |

OTHER PUBLICATIONS

Office Action dated Jun. 29, 2009 from the Japanese Patent Office in corresponding Japanese patent application No. 2005-057755 (and English Translation).

* cited by examiner

*Primary Examiner*—Anand Bhatnagar
(74) *Attorney, Agent, or Firm*—Posz Law Group, PLC

(57) ABSTRACT

Front left and right cameras are arranged at front left and right end parts, respectively, of a vehicle to capture a corresponding peripheral image around the vehicle. A control circuit controls a displaying operation of a display device based on a sensed current position of the vehicle and road map information in such a manner that when the vehicle approaches a junction where a current road, along which the vehicle currently travels, joins an encountering road, the peripheral images of front left and right cameras showing a corresponding view of the encountering road are displayed on the display device upon satisfaction of predetermined conditions.

18 Claims, 9 Drawing Sheets

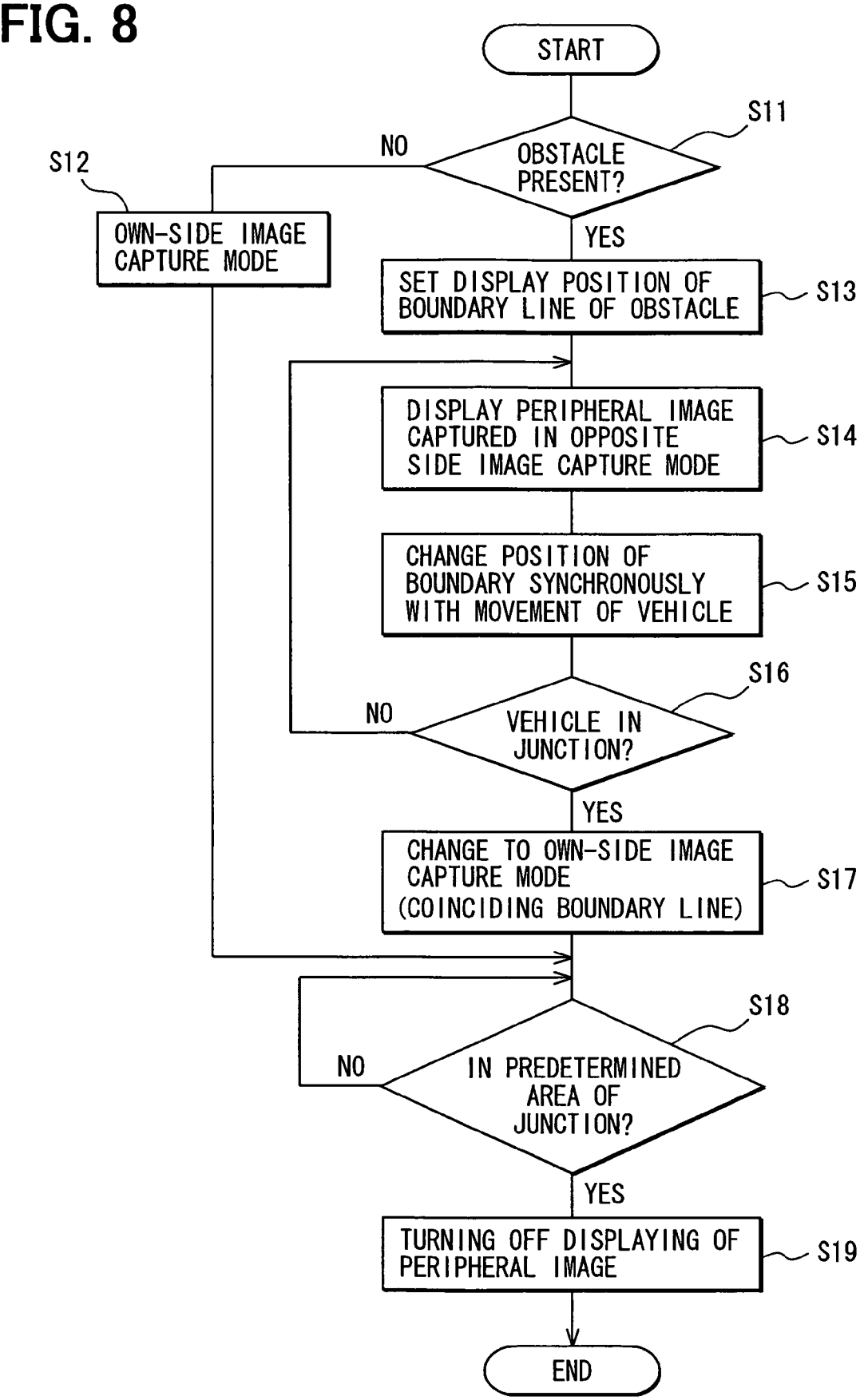

DRIVE ASSIST SYSTEM AND NAVIGATION SYSTEM FOR VEHICLE

CROSS REFERENCE TO RELATED APPLICATION

This application is based on and incorporates herein by reference Japanese Patent Application No. 2005-57755 filed on Mar. 2, 2005.

BACKGROUND OF THE INVENTION

1. Field of the Invention

The present invention relates to a drive assist system and a navigation system for a vehicle.

2. Description of Related Art

A drive assist system, which includes cameras for capturing a peripheral image around a vehicle and provides drive assistance to a driver of the vehicle through use of the captured peripheral image, is recited in, for example, Japanese Unexamined Patent Publication Number 2001-116567. This drive assist system constitutes a part of a navigation system. Furthermore, in this system, six cameras are provided to capture images of a front view, a right oblique front view, a left oblique front view, a rear view, a right oblique rear view and a left oblique rear view of the vehicle, respectively. Based on the image data of these captured images, a bird's-eye view, which indicates whether an obstacle(s) is present in an area around the vehicle, is produced and is displayed on a display device. Furthermore, in this case, the navigation system can display a sensed position of the vehicle together with a map on the display device. The displayed screen on the display device is switched when the driver of the vehicle operates a corresponding touch panel or provides a corresponding voice input.

Vehicle-to-vehicle collisions, vehicle-to-pedestrian collisions and vehicle-to-bicycle collisions at, for example, crossroad junctions and T-junctions constitute a large ratio of traffic accidents. Particularly, these collisions tend to occur in a junction of roads where a width of at least one of the roads is narrow, in a junction of roads where a traffic signal and a pedestrian crossing is absent, or in a junction of roads where a view is poor. Therefore, there is a need for limiting occurrence of such collisions. Thus, there is a market demand for a drive assist system, which includes a car navigation apparatus and effectively limits occurrence of the collisions in the junctions to assist the safe drive of the driver.

However, the previously proposed drive assist system is intended to allow the driver to recognize obstacles around the own vehicle in a car park or a narrow road having crowded traffic and is not intended to improve the safety. Furthermore, in the previously proposed drive assist system, switching from the navigational screen to the bird's eye view diagram screen and switching from the bird's eye view diagram screen to the navigational screen are executed based on the manual key entry or voice input from the user, so that the user is required to perform the bothersome operation, and the switching may not be executed at appropriate timing in some cases.

SUMMARY OF THE INVENTION

The present invention is made in view of the above disadvantages. Thus, it is an objective of the present invention to provide a drive assist system, which assists safe drive of a driver of a vehicle having the drive assist system at, for example, a junction of roads by displaying a peripheral image around the vehicle and which switches a displayed screen on a display device at appropriate timing while alleviating bothersome operation of the driver or any other user. It is another objective of the present invention to provide a navigation system, which assists safe drive of a driver of a vehicle having the navigation system at, for example, a junction of roads by displaying a peripheral image around the vehicle and which switches a displayed screen on a display device at appropriate timing while alleviating bothersome operation of the driver or any other user.

To achieve the objectives of the present invention, there is provided a drive assist system for a vehicle. The drive assist system includes front left and right cameras, a display device, a map database, a vehicle position sensing means, a display control means and a condition setting means. The front left and right cameras are arranged at front left and right end parts, respectively, of the vehicle to capture a corresponding peripheral image around the vehicle. The display device is arranged in a passenger compartment of the vehicle and is connected with the front left and right cameras. The map database stores road map information. The vehicle position sensing means is for sensing a current position of the vehicle. The display control means is for controlling a displaying operation of the display device based on the sensed current position of the vehicle and the road map information in such a manner that when the vehicle approaches a junction where a current road, along which the vehicle currently travels, joins an encountering road, at least one of the peripheral images of the front left and right cameras, which shows a corresponding view of the encountering road, is displayed on the display device upon satisfaction of one or more predetermined conditions. The condition setting means is for setting at least one of the one or more predetermined conditions.

To achieve the objectives of the present invention, there is also provided a navigation system for a vehicle. The navigation system includes at least one front camera, a display device, a map database, a vehicle position sensing device, a control unit and a condition setting arrangement. The at least one front camera is arranged at a front part of the vehicle to capture a corresponding peripheral image around the vehicle. The display device is arranged in a passenger compartment of the vehicle and is connected with the at least one front camera. The map database stores road map information. The vehicle position sensing device senses a current position of the vehicle. The control unit controls a displaying operation of the display device based on the sensed current position of the vehicle and the road map information in such a manner that when the vehicle approaches a junction where a current road, along which the vehicle currently travels, joins an encountering road, the peripheral image of the at least one front camera, which shows a corresponding view of the encountering road, is displayed on the display device upon satisfaction of one or more predetermined conditions. A user is allowed to set at least one of the one or more predetermined conditions through the condition setting arrangement.

BRIEF DESCRIPTION OF THE DRAWINGS

The invention, together with additional objectives, features and advantages thereof, will be best understood from the following description, the appended claims and the accompanying drawings in which:

FIG. 8 is a flowchart showing a procedure for displaying a peripheral image according to the second embodiment;

DETAILED DESCRIPTION OF THE INVENTION

Various embodiments of the present invention will be described with reference to the accompanying drawings. In each of the following embodiments, a drive assist system of the present invention is constructed as a part of a car navigation system installed in a vehicle (an automobile), so that a hardware of the car navigation system is commonly used by the drive assist system.

First Embodiment

Figure 1:
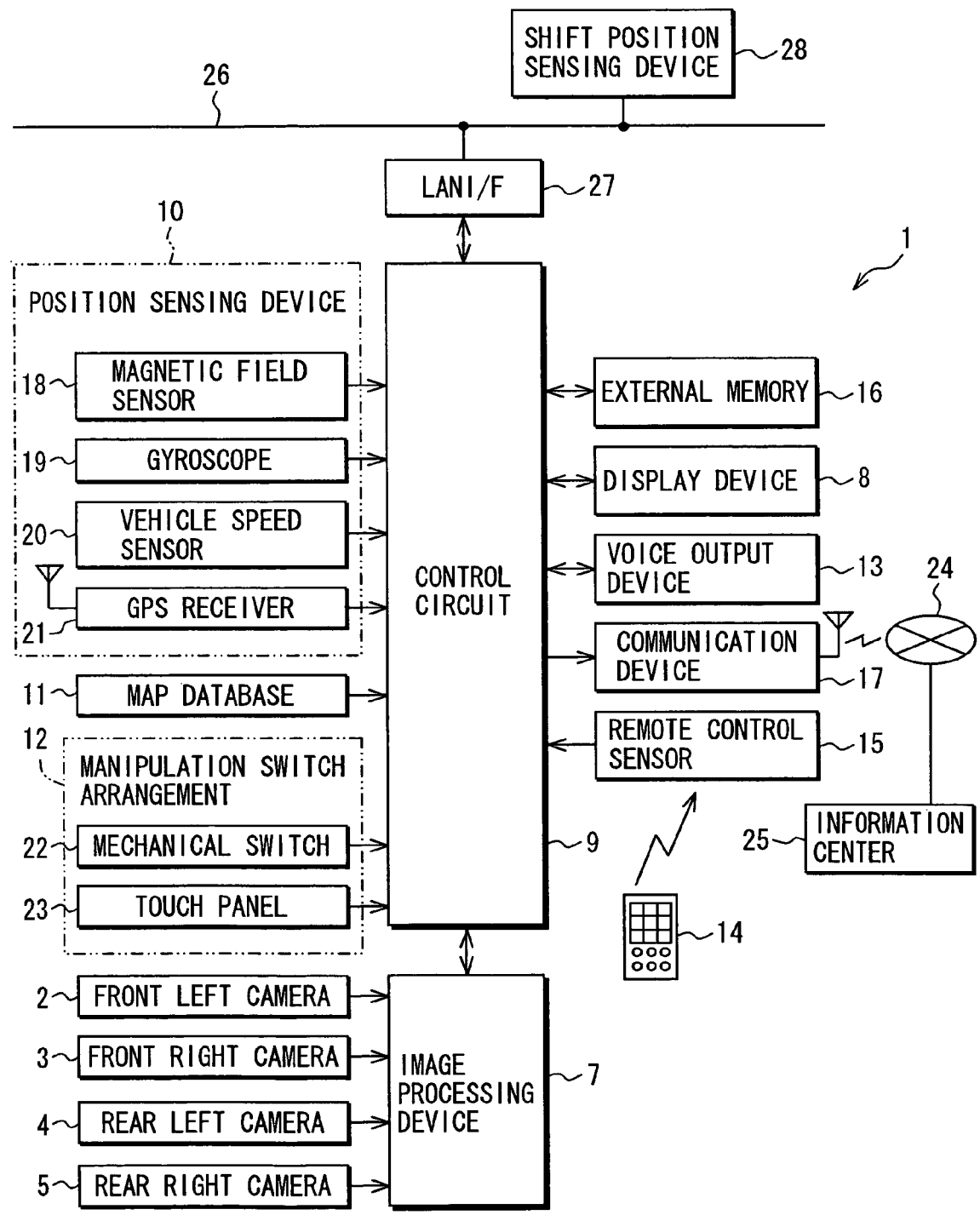
FIG. 1 is a block diagram schematically showing an overall structure of a car navigation system according to a first embodiment of the present invention.

A first embodiment of the present invention will be described with reference to FIGS. 1 to 6. FIG. 1 schematically shows an entire electrical construction of the car navigation system 1, which includes the drive assist system of the present embodiment. In the car navigation system 1, multiple cameras (in this instance, four cameras) 2-5, which serve as an image capturing means, are connected to a car navigation system main body, which has a known structure.

Figure 2:
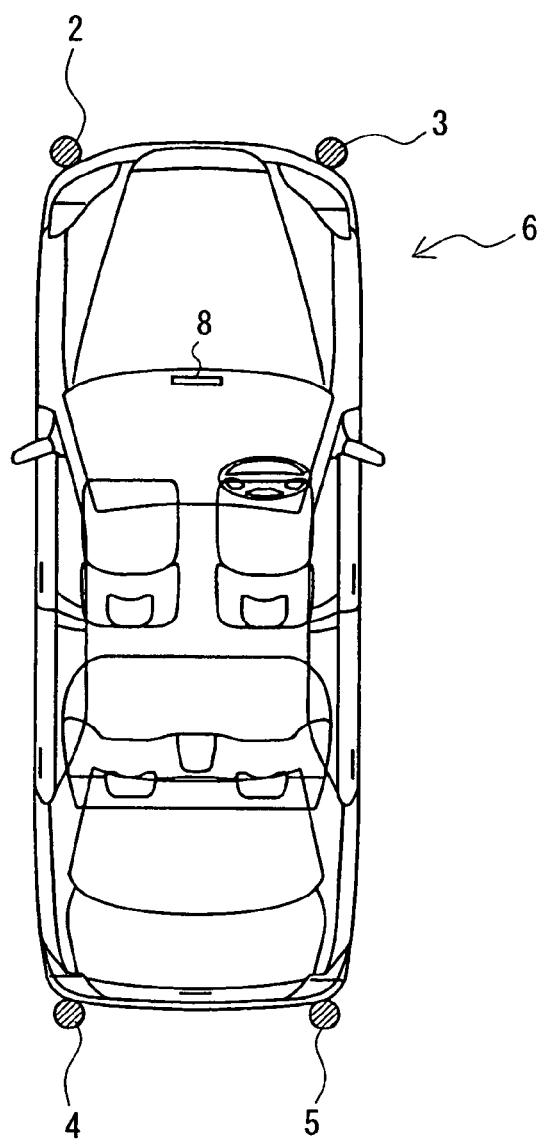
FIG. 2 is a plan view of a vehicle having cameras according to the first embodiment.

With reference to FIG. 2, the cameras 2-5 are made as, for example, autofocus CCD cameras and are installed to a front left end part (i.e., a part including a front left end and an area adjacent to the front left end), a front right end part (i.e., a part including a front right end and an area adjacent to the front right end), a rear left end part (i.e., a part including a rear left end and an area adjacent to the rear left end) and a rear right end part (i.e., a part including a rear right end and an area adjacent to the rear right end), respectively, of a body of the vehicle (automobile) 6 that has the car navigation system 1. Each camera 2-5 captures a peripheral image of a corresponding area around the vehicle (hereinafter, simply referred to as an peripheral image). A captured image of each camera 2-5 is inputted to an image processing device 7 (FIG. 1) and is displayed on a display device 8, which is arranged in a passenger compartment (e.g., at a top center of an instrument panel) of the vehicle 6.

The cameras 2-5 will be referred to as a front left camera 2, a front right camera 3, a rear left camera 4 and a rear right camera 5, respectively. The cameras 4, 5 serve as rear cameras of the present invention. Although not depicted in detail, each camera 2-5 is driven by a drive mechanism to pivot, i.e., rotate about its vertical rotational axis within a predetermined angular range (e.g., 150 degrees) to automatically change its image capture angle (a field of view).

Referring back to FIG. 1, the car navigation system main body has a microcomputer as its main component, which includes a CPU, a ROM and a RAM. In the present embodiment, the car navigation system main body includes a control circuit (or a control unit) 9, which controls an entire operation of the car navigation system 1. A position sensing device (serving as a vehicle position sensing means) 10, a map database 11, a manipulation switch arrangement (a group of manipulation switches) 12, the display device 8, the voice output device 13, a remote control sensor 15 for sensing a signal from a remote control device 14, an external memory 16 and a communication module (a communication device) 17 are connected to the control circuit 9.

The position sensing device 10 includes a magnetic field sensor 18, a gyroscope 19, a vehicle speed sensor 20 and a GPS receiver 21. The magnetic field sensor 18 senses an absolute azimuth. The gyroscope 19 measures a rotational angular velocity of the vehicle. The vehicle speed sensor 20 senses a vehicle travel speed (or simply referred to as a vehicle speed). The GPS receiver 21 receives signals form GPS satellites. Based on the inputs received from the sensors 18-21 of the position sensing device 10, the control circuit 9 relatively accurately determines a current position of the vehicle, a travel direction of the vehicle, a travel speed of the vehicle, a travel distance of the vehicle and the current time.

The map database 11 includes a storage medium and a drive device. The storage medium stores various data, which includes, for example, road map data, facility data (destination data) indicating facilities along roads, map matching data for improving accuracy in the sensing of the position. The storage medium could be, for example, a mass storage medium, such as a CD-ROM or a DVD. The drive device is for retrieving the data from the medium. The road map data includes road configuration data, road type data as well as other data, which indicates road names, traffic signals, rail road crossings, buildings, facilities, place-names, geography and the like associated with the roads. The road map data further includes data for reproducing the navigation road map on the screen of the display device 8.

Figure 4A:
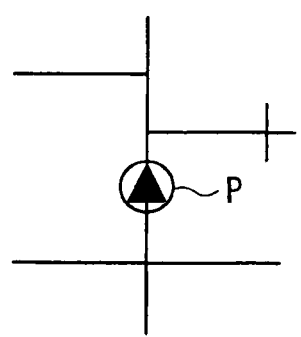
FIG. 4A is a diagram showing a map according to the first embodiment.
Figure 4B:
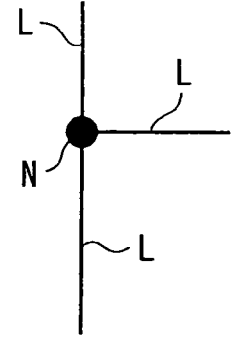
FIG. 4B is a diagram showing road configuration data according to the first embodiment.

Here, as shown in FIG. 4B, the road configuration data includes data (position coordinates), which contains multiple points, i.e., nodes (indicating, for example, junctions) N and links L, each of which connects between corresponding two of the nodes N. The road type data includes data of road types, such as a highway (motor road), an ordinary national road, a state road, a provincial road, a city road, a town road and the like. The road data also includes data of road widths (e.g., a road width equal to or greater than 5.5 m or a road width less than 5.5 m).

The manipulation switch arrangement 12 includes a mechanical switch(es) 22, which is arranged near the screen of the display device 8, and a touch panel switch(es) 23, which is provided on the screen of the display device 8. A user (a driver) can manipulate the switch arrangement 12 to specify a destination and to input various commands, such as a scale selection command for selecting a scale of the road map displayed on the display device 8. Furthermore, as will be described below, the user can manipulate the switch arrangement 12 to set a display condition(s) for displaying the corresponding peripheral image. The remote control device 14 is constructed to implement functions similar to those of the switch arrangement 12.

The display device 8 may be, for example, a full color liquid crystal display. During a normal operation, the road map can be displayed on the display device 8 at various scales, and a pointer P, which indicates a current position and a current travel direction of the vehicle, can be displayed over the road map on the display device 8. Also, the display device 8 can display an input/setting screen(s) for executing various inputs and settings by the user. In addition, the display device 8 can also display various messages and information. Furthermore, at the time of executing the route guidance function for guiding the vehicle to the destination, a recommended route to the destination can be displayed over the road map on the display device 8. In addition, the display device 8 can display the peripheral image(s) V captured by the camera(s) 2-5, which are connected to the display device 8 through the control circuit 9.

The voice output device 13 outputs required messages as synthesized voices through a speaker at the time of executing the route guidance. The communication module 17 communicates with an information center 25 by way of radio communication through, for example, a communication network (e.g., a cellular phone network, the internet) 24 to obtain, for example, road traffic information from the information center 25.

The cameras 2-5 are connected to the control circuit 9 through the image processing device 7. Furthermore, the control circuit 9 is connected to an on-vehicle LAN 26 through a LAN interface 27. A shift position sensing device 28, which senses a shift position of a transmission, is connected to the on-vehicle LAN 26. The control circuit 9 obtains a sensed position signal from the shift position sensing device 28 to sense (recognize or determine) the shift position of the transmission.

Through execution of its relevant software, the control circuit 9 implements the location function for sensing a current position of the own vehicle and the route guidance function for finding a recommended route to the destination and for guiding the vehicle along the recommended route based on the map data of the map database 11.

Figure 5A:
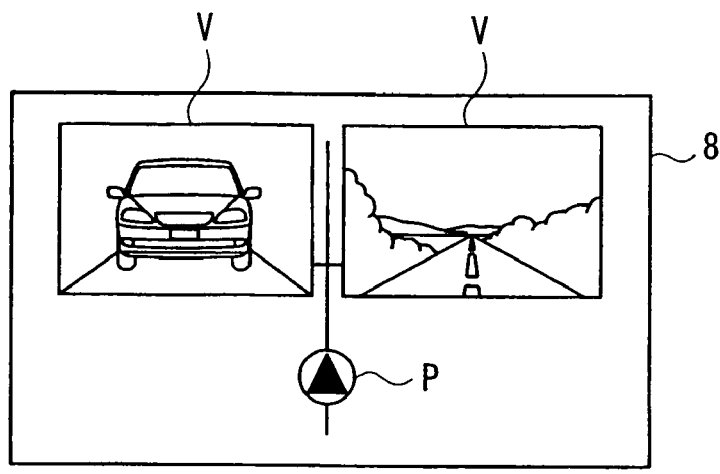
FIG. 5A is a diagram showing exemplary peripheral images for a junction of right-angle crossroads according to the first embodiment.
Figure 5B:
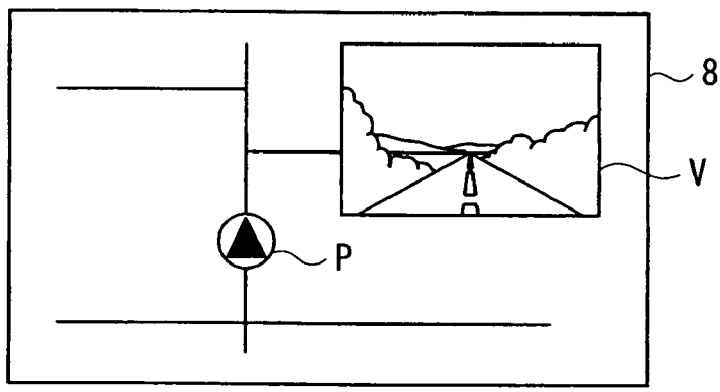
FIG. 5B is a diagram showing an exemplary peripheral image for a T-junction of roads according to the first embodiment.

As shown in FIGS. 4A and 5A-5B, the location function implements displaying of the road map on the screen of the display device 8 based on the map data retrieved from the map database 11 and also displaying of the current position mark (the pointer P), which indicates the current position and travel direction of the vehicle 6 on the screen of the display device 8 based on the sensed result of the position sensing device 10. In this instance, the map is displayed in such a manner that the travel direction of the vehicle 6 coincides with an upward direction of the map. Furthermore, the pointer P moves along the map upon traveling of the vehicle 6, and the map is scrolled on the screen of the display device 8 in such a manner that the pointer P is always positioned at a location slightly downward of the center of the screen of the display device 8. At this time, the map matching is performed to place the current position of the vehicle 6 on the corresponding adjacent road.

Upon input operation through the switch arrangement 12 by the user, the route guidance function implements automatic computation of the recommended route from the start point (the current position) of the vehicle to the user-specified destination of the vehicle through use of the known Dijkstra's algorithm. At the same time, the route guidance function implements display and guidance of the recommended route to the destination on the screen of the display device 8 through use of a corresponding color that is different from that of the other roads and also implements the voice guidance (e.g., the guidance that tells the driver to make a left turn at the next junction located 200 m ahead of the vehicle) through the voice output device 13 at predetermined timing.

Furthermore, in the present embodiment, as discussed above, the peripheral image(s) V, which is captured by the camera(s) 2-5 and shows the area around the vehicle, can be displayed on the display device 8 to assist the driving operation of the user (driver), thereby implementing the function of the drive assist system. At this time, as will be described latter, based on the current position of the vehicle 6 obtained from the position sensing device 10 and the road map data of the map database 11, the control circuit 9 controls a displaying operation of the display device 8 to automatically display an image of an approaching merged road that is captured by the camera(s) 2-5 and is merged with (i.e., intersected with or branched from) the current road, along which the vehicle 6 currently travels, at a junction. Thus, the control circuit 9 functions as a display control means for controlling the displaying operation of the display device 8. Here, it should be noted that word "junction" means a place where two or more roads join or meet and therefore includes, for example, a junction of right-angle crossroads, a Y-junction of roads, a T-junction of roads and any other type of junctions (or branching points) of multiple roads (e.g., two roads, three roads, four roads, five roads, etc).

Specifically, in a case where the vehicle 6 travels forward, and it is determined that a junction (in this particular instance, a junction of right-angle crossroads) is present ahead of the vehicle based on the road map data, when the vehicle 6 reaches a predetermined range from the junction, the peripheral image V of the left side view of the intersecting road, i.e., encountering road (the other road, which is other than the current road and intersects with the current road at the junction) captured by the front left camera 2 and the peripheral image V of the right side view of the approaching road captured by the front right camera 3 are displayed on the display device 8, as shown in FIG. 5A. In this instance, the peripheral image V of the left side view taken on the left side of the vehicle is displayed at a left upper part of the screen of the display device 8 in a form of a window screen that overlaps with, i.e., is superimposed over a corresponding part of the displayed map, and the peripheral image V of the right side view taken on the right side of the vehicle is displayed at a right upper part of the screen of the display device 8 in a form of a window screen that overlaps with a corresponding part of the displayed map.

Figure 6:
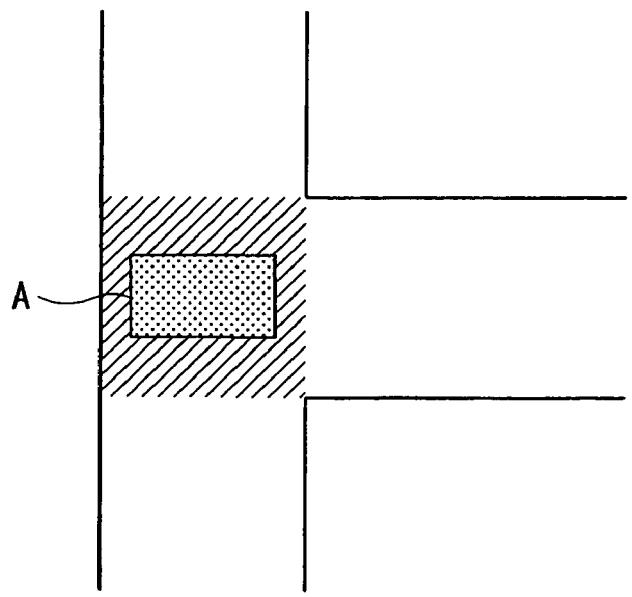
FIG. 6 is a schematic diagram showing a range for stopping the displaying of the peripheral image according to the first embodiment.

Furthermore, when it is determined that a branched road, which is branched from the current road and thereby forms a T-junction in cooperation with the current road, is present ahead of the vehicle 6 on the right side, the peripheral image V of the right view where the branched road exists is captured by the front right camera 3 and is displayed at the right upper part of the screen of the display device 8, as shown in FIG. 5B. Furthermore, as shown in FIG. 6, when it is determined that the own vehicle 6 enters, i.e., is in the center (a dark solid area A) of the junction (indicated by a hatching) where the driver can directly visually recognize the other road, which is other than the current road and intersects with the current road at the junction, the displaying of the peripheral image(s) captured by the camera(s) 2-5 is automatically stopped by the control circuit 9, thereby returning to the normal map display mode for displaying the map without the peripheral image(s).

In the present embodiment, the conditions for automatically displaying the peripheral image(s) V of the camera(s) 2-5 on the display device 8 can be freely set, selected or modified by the user. Although not illustrated in detail, the setting (modification) of these conditions is performed by the user through manipulation of the manipulation switch arrangement 12 (also referred to as a condition setting means or a condition setting arrangement) in a state where an initial setting screen for initially setting the navigation function is displayed on the display device 8.

In this instance, the selectable conditions may include at least one of the road type of the current road, the road type of the approaching road (encountering road), the width of the current road, the width of the approaching road, the speed of the vehicle 6, the distance from the vehicle 6 to the junction and presence/absence of a traffic signal at the junction, and it is possible to set at least one of these conditions. In the present embodiment, a corresponding standard initial value is preset for each of these conditions, and the user can freely change the value. The standard initial values may include the followings. That is, the road type of at least one of the current road and the approaching road is a local road (e.g., a state road, a provincial road, a city road, a town road and the like) and has the road width less than 5.5 m, and the speed of the own vehicle is 20 km/h or less, and the own vehicle is 10 m ahead of the junction. The user may also select disablement of the displaying of the peripheral image(s) V (disablement of the drive assist function).

When it is determined that the vehicle 6 backs up based on the signal of the shift position sensing device 28, the peripheral image V of the rear left camera 4 and/or the peripheral image V of the rear right camera 5 are displayed on the display device 8. Switching on and off of the displaying of the peripheral image(s) V of the camera(s) 2-5 on the display device 8 may be accomplished automatically, as discussed above, or may be accomplished manually through a manual operation of a corresponding switch by the user.

Next, the operation of the car navigation system 1 (the drive assist system) will be described with reference to FIG. 3. As discussed above, when the user (the driver) uses the drive assist system, the conditions for displaying the peripheral image(s) V can be freely set. When the user feels that the displaying of the peripheral image(s) V is too frequent and is annoying the user, the conditions may be narrowed (tightened). In contrast, when the user wants to increase the display frequency of the peripheral image(s) V, the conditions may be widened (loosen). In a case where the user does not want to display the peripheral image V, the drive assist function may be turned off.

Figure 3:
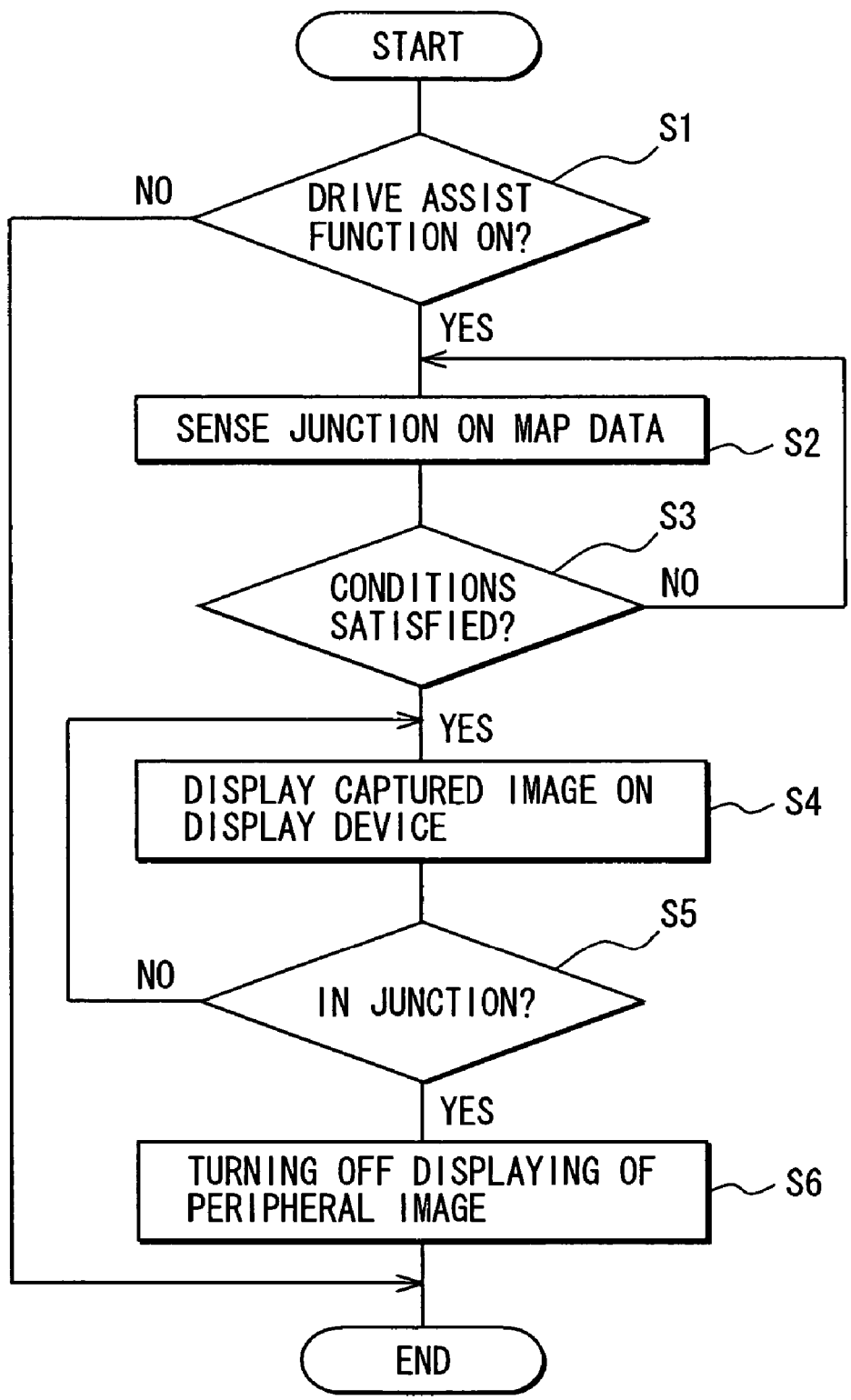
FIG. 3 is a flowchart showing a procedure of a drive assist operation executed by a control circuit according to the first embodiment.

A flowchart of FIG. 3 shows a procedure for the drive assist operation (the displaying of the peripheral image(s) on the display device 8) executed by the control circuit 9. In a case where the drive assist function is turned on (YES at step S1), control proceeds to step S2. At step S2, a junction, which is located ahead in a traveling direction of the own vehicle, is monitored (sensed). As shown in FIGS. 4A and 4B, this process is executed based on the position of the own vehicle sensed by the position sensing device 10 and the road map data (link information) of the map database 11. At the following step S3, it is determined whether the sensed junction satisfies the required displaying conditions.

When all of the displaying conditions are satisfied (i.e., YES at step S3), control proceeds to step S4 where the peripheral image(s) V of the camera(s) 2, 3 is displayed on the screen of the display device 8 (see FIGS. 5A and 5B). In the case of the above standard conditions, for example, the displaying operation for displaying the peripheral image(s) of the camera(s) 2, 3 on the display device 8 starts when the following conditions are all satisfied: at least one of the current road and the approaching road is a local road and has a road width less than 5.5 m, and the speed of the vehicle sensed by the vehicle speed sensor 20 is equal to or less than 20 km/h, and the vehicle is located 10 m ahead of the junction. When at least one of the conditions is not satisfied (NO at step S3), the peripheral image(s) V at the subject junction is not displayed on the screen of the display 8, and control returns to step S2 to sense the subsequent approaching junction.

The displaying operation at step S4 is carried out such that the peripheral image(s) V of the approaching road (encountering road) captured by the camera(s) 2, 3 is overlapped over the corresponding portion of the image displayed on the screen of the display device 8. With reference to FIGS. 5A and 5B, in this displaying operation, the peripheral image V of the left side view of the approaching road captured by the front left camera 2 on the left side of the vehicle is displayed at the left upper part of the screen, and the peripheral image V of the right side view of the approaching road captured by the front right camera 3 on the right side of the vehicle is displayed at the right upper part of the screen.

Thus, like in the case of FIG. 5A, when the vehicle 6 is approaching the junction of the right-angle crossroads, the two peripheral images V of the cameras 2, 3 are displayed at the upper left part and the upper right part, respectively, of the screen of the display device 8. Furthermore, in the case of the T-junction of the roads where the approaching road is present only on one of the left and right sides of the vehicle 6 (in FIG. 5A, only on the right side), the peripheral image V of the one of the left and right sides of the vehicle is displayed. More specifically, in the case of the T-junction of FIG. 5B where the approaching road is present only on the right side of the vehicle 6, the peripheral image V of the front right camera 3 is displayed on the upper right part of the screen of the display device 8. The user (the driver) watches the peripheral image(s) V, so that presence of other vehicles, pedestrians, bicycles and/or the like in the approaching road can be recognized further in advance in comparison to the case where the drive directly visually recognizes them with his/her eyes, thereby enabling the safer drive of the vehicle.

At next step S5, it is determined whether the current position of the own vehicle 6 enters and is thus in the junction. When it is determined that the current position of the vehicle 6 is in the junction, the vehicle 6 is in the dark solid area A in the center of the junction where the driver can directly visually recognize the other road, like in FIG. 6. Therefore, when it is determined that the current position of the own vehicle 6 is in the junction (YES at step S5), control proceeds to step S6. At step S6, the displaying of the peripheral image(s) V on the display device 8 is automatically stopped, thereby returning to the navigational display mode where the peripheral image(s) V is not displayed.

As described above, according to the present embodiment, through the displaying of the peripheral image(s) V of the camera(s) 2-5 on the display device 8, the driver can watch the displayed image(s) V and recognize the state of the corresponding part of the road, which is difficult or not possible to directly recognize with the eyes. This allows an improvement in the drive safety. At this time, when the own vehicle comes close to the approaching road at the next approaching junction, the peripheral image(s) V of the approaching road is automatically displayed on the display device 8. Thus, without requiring a bothersome operation of the user, the effective displaying of the peripheral image(s) V for assisting the safety drive at the junction can be executed at the appropriate timing. Furthermore, the conditions for displaying the peripheral image(s) V on the display device 8 can be set according to the preference of the user. Thus, the annoyance of the user caused by excessive displaying of the peripheral image(s) or the insufficient feeling of the user with respect to insufficient displaying of the peripheral image(s) can be avoided or alleviated in advance.

Second, Third, and Other Embodiments

FIGS. 7A-11C show a second embodiment of the present invention. In each of the following embodiments, the present invention is implemented in a car navigation system, and a hardware construction of each of the following car navigation systems is substantially the same as that of the first embodiment. Thus, in each of the following embodiments, the components similar to those of the first embodiment will be indicated by the same reference numerals and will not be described in detail, so that only characteristic parts of each of the following embodiments will be described.

The second embodiment differs from the first embodiment in the following point. That is, in the second embodiment, the front left camera 2 can be operated to capture the right side view of the vehicle 6, and the front right camera 3 can be operated to capture the left side view of the vehicle 6. In other words, there is implemented an opposite-side image capture mode for capturing the peripheral image of an opposite side view on an opposite side (the right side or the left side) of the vehicle, which is opposite from the side where each camera 2, 3 is located, through use of the camera 2, 3. In this instance, the control circuit 9 automatically controls the orientation (the image capture angle) of each camera 2-5 to one of the opposite-side image capture mode and an own-side image capture mode (described below) depending on a state of the junction.

Figure 7A:
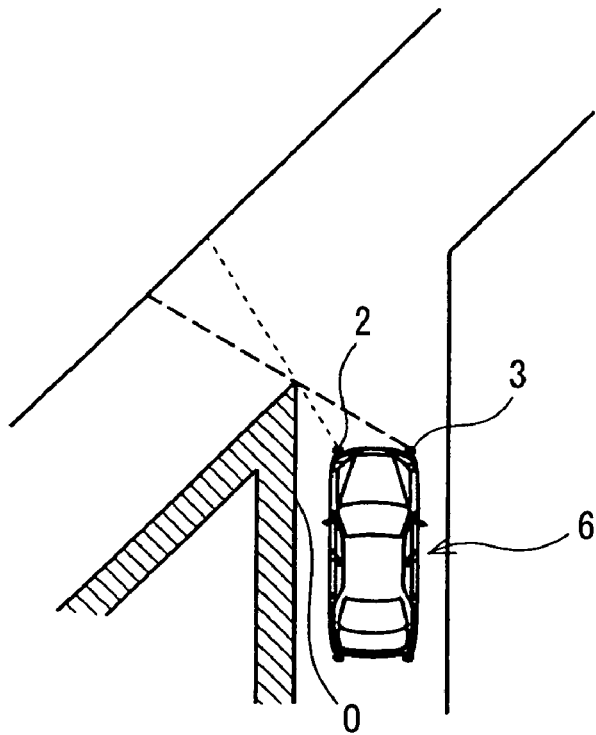
FIG. 7A is an exemplary diagram showing a junction of roads, at which an opposite-side image capture mode is implemented according to a second embodiment of the present invention.
Figure 7B:
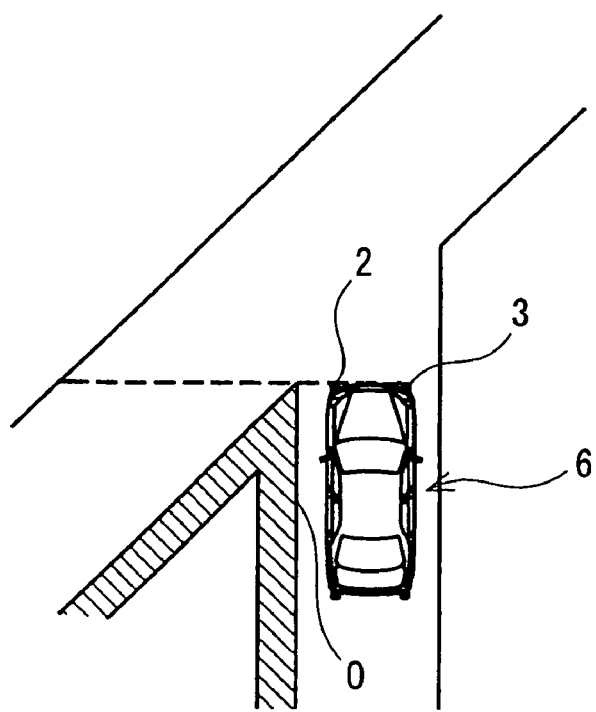
FIG. 7B is an exemplary diagram similar to FIG. 7A, showing switching from the opposite-side image capture mode to an own-side image capture mode according to the second embodiment.

Specifically, for example, as shown in FIGS. 7A and 7B, in a case where the vehicle 6 approaches a Y-junction, if an obstacle O (indicated with a hatching in FIGS. 7A and 7B), such as a fence, a wall of a building, is present on the left side of the current road, along which the vehicle travels, a viewable range of the front left camera 2 for viewing the left side view of the approaching road is disadvantageously narrowed by the obstacle O. In contrast, a viewable range of the front right camera 3 for viewing the left side view of the approaching road is much greater than that of the front left camera 2. In this case, until the front end of the vehicle 6 reaches the junction, as shown in FIG. 7B, the viewable range of the front right camera 3 for capturing the left side view of the approaching road is greater than that of the front left camera 2. Then, after the front end of the vehicle 6 reaches the junction, the viewable range of the front left camera 2 for capturing the left side view of the approaching road becomes greater than that of the front right camera 3 (the own-side image capture mode).

Thus, in the present embodiment, as will be described with reference to a flowchart shown in FIG. 8, in the case where the drive assist function is turned on, and the conditions for displaying the peripheral image(s) V of the camera(s) 2, 3 on the display device 8 are satisfied for the next approaching junction, the control circuit 9 determines whether there is the visual obstacle O, which is located ahead of the junction on the current road and obstructs the view of the subject camera 2, 3 for capturing the peripheral image of the approaching road on the corresponding side of the vehicle 6 where the camera 2, 3 is located. When it is determined that there is the obstacle O, which is located ahead of the junction and obstructs the view of the camera 2, 3, the image capture mode of the camera 2, 3, which is located on the obstacle side of the vehicle 6 where the obstacle O is present, is changed to the opposite-side image capture mode. Thereafter, the image capture mode of each camera 2, 3 is placed in the own-side image capture mode.

At this time, the control circuit 9 determines whether there is the obstacle O based on building information, which is stored in the map database 11. Therefore, the control circuit 9 implements a function of an obstacle sensing means. Furthermore, as will be described below, the switching from the opposite-side image capture mode to the own-side image capture mode is carried out while a boundary line B, which corresponds to an end of the visual obstacle O, is fixed in a predetermined position on the screen of the display device 8.

The flowchart of FIG. 8 shows a procedure for displaying the peripheral image V executed by the control circuit 9 in the present embodiment. Furthermore, in this description, as shown in FIGS. 9 and 11, there will be described an exemplary case where the vehicle 6 approaches a junction where an approaching road is branched off on a left side of the vehicle 6 from the current road, along which the vehicle 6 travels.

Specifically, at the time of displaying the peripheral image V, it is determined whether the visual obstacle O, such as the wall of the building or the fence, is present at an image capturing side (the left side in the case of FIG. 9) of the current road, along which the vehicle travels. When it is determined that the visual obstacle O is not present (NO at step S11), the peripheral image V is captured by the camera 2, 3 in the own-side image capture mode and is displayed on the screen of the display device 8 at step S12. The displaying of the peripheral image V, which is captured in the own-side image capture mode, is similar to the one described in the first embodiment and will not be described any further.

Figure 9:
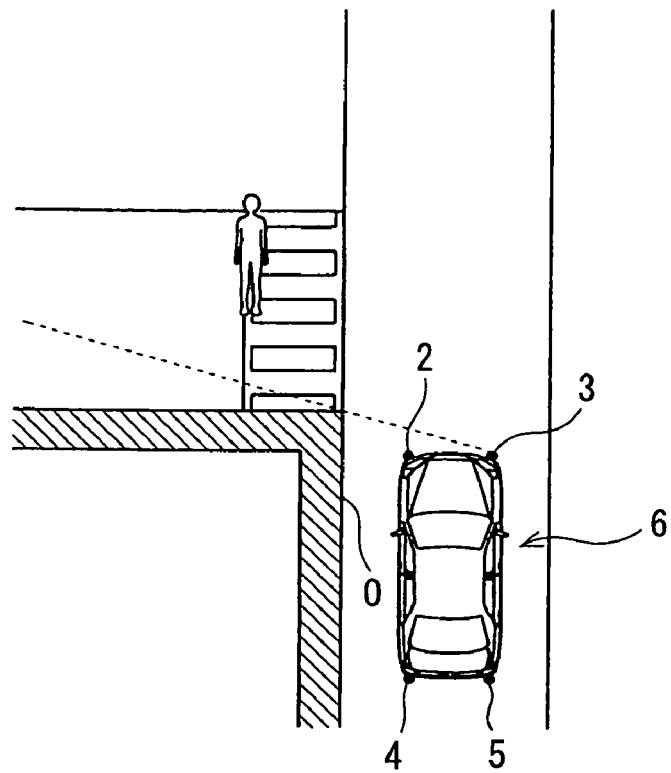
FIG. 9 is a plan view showing an exemplary junction where a visual obstacle is present according to the second embodiment.
Figure 10:
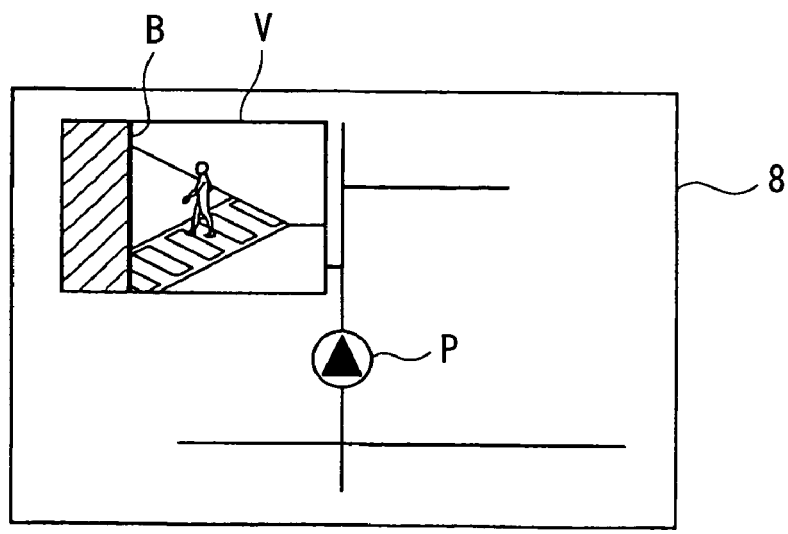
FIG. 10 is a diagram showing exemplary displaying of a peripheral image according to the second embodiment.
Figure 11A:
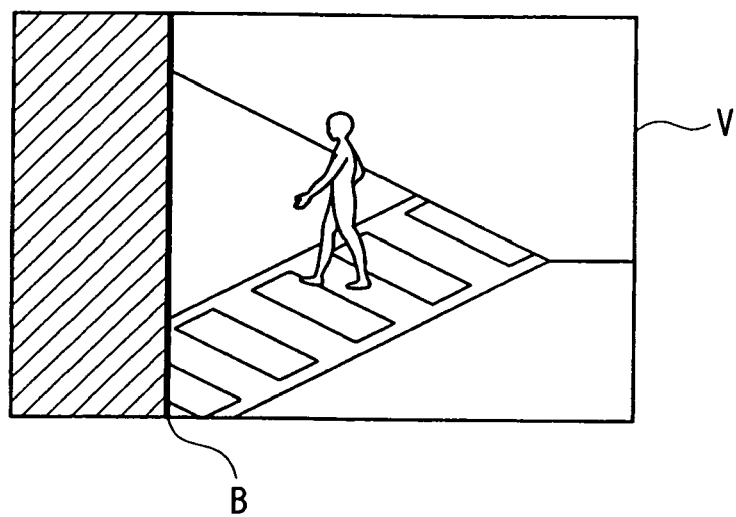
FIG. 11A is a peripheral image captured by a front right camera in the opposite-side image capture mode according to the second embodiment.
Figure 11B:
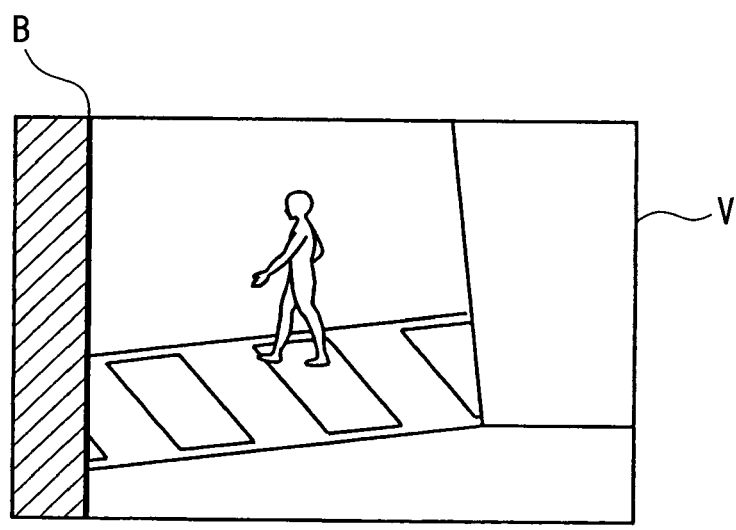
FIG. 11B is another peripheral image captured by the front right camera in the opposite-side image capture mode according to the second embodiment.
Figure 11C:
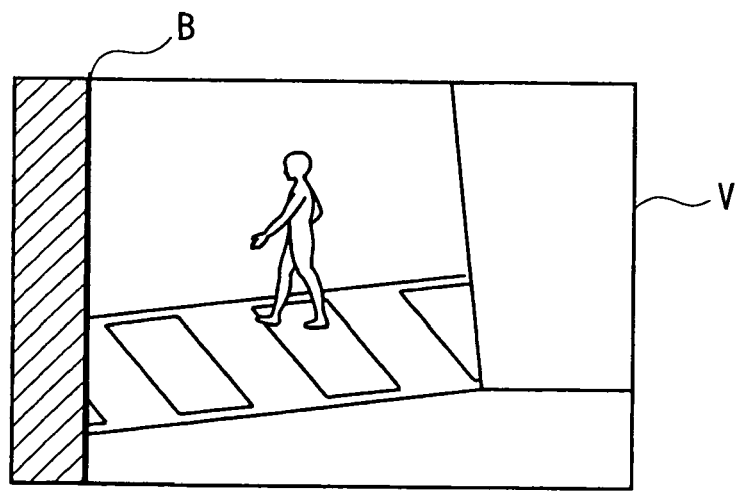
FIG. 11C is a peripheral image captured by a front left camera in the own-side image capture mode according to the second embodiment.

In contrast, when it is determined that the visual obstacle O is present on the left side where the branched road exists (YES at step S11) like in the case of FIG. 9, control proceeds to step S13. At step S13, a position of the boundary line B, which corresponds to the end of the visual obstacle O, is set on the screen. At this time, as shown in FIGS. 10 to 11C, in the case of capturing the peripheral image of the left side, the position of the boundary line B is set to be close to the left end of the screen. In the following step S14, the peripheral image V is captured by the camera 2, 3 (e.g., the front right camera 3 in the case of FIG. 9) in the opposite-side image capture mode, and the captured peripheral image V is displayed on the screen of the display device 8. At step S15, the position of the boundary B on the screen of the display device 8 is changed to correspond with further movement of the vehicle 6.

In the case of FIG. 9, the peripheral image V of the other road side (the left side) is captured by the front right camera 3, and as shown in FIG. 10, the captured peripheral image V is displayed at the left upper part of the screen of the display device 8. Furthermore, as shown in FIG. 11A, at the beginning of the displaying of the captured peripheral image V, the boundary line B is located closer to the center of the captured peripheral image V. However, as shown in FIG. 11B, when the vehicle 6 moves further forward, i.e., when the front right camera 3 moves further, the boundary line B moves toward the left side of the captured peripheral image V.

Although not illustrated, in the case of, for example, the junction of the right-angle crossroads, where the other approaching road exists on both of the left side and the right side of the current road, the front left camera 2 captures the peripheral image V on the right side of the vehicle 6, and the captured peripheral image V is displayed on the right side of the screen of the display device 8.

At step S16, it is determined whether the front end of the own vehicle (vehicle 6) is in the junction. When it is determined that the own vehicle is in the junction (YES at step S16), control proceeds to step S17. At step S17, the opposite-side image capture mode is changed to the own-side image capture mode. In the case of FIGS. 9 to 11C, the peripheral image V on the left side of the vehicle 6 is captured by the front left camera 2 and is displayed at the left upper part of the screen of the display device 8, as shown in FIG. 11C. At the time of switching the display mode, as shown in FIGS. 11B and 11C, the switching of the display mode is carried out in such a manner that the boundary line B is fixed, i.e., location of the boundary line B is coincided between the display mode before the switching and the display mode after the switching.

Thereafter, similar to the first embodiment, at step S18, it is determined whether the current position of the own vehicle 6 is in the predetermined area A of the junction where the driver can directly visually recognize the other road, which is other than the current road and intersects with the current road at the junction. When it is determined that the current position of the own vehicle 6 enters and is therefore in the predetermined area A of the junction (YES at step S18), control proceeds to step S19. At step S19, the displaying of the peripheral image(s) V on the display device 8 is automatically stopped, thereby returning to the navigational display mode.

According to the second embodiment, similar to the first embodiment, the peripheral image(s) V around the vehicle 6 is captured by the camera(s) 2-5 and is displayed on the screen of the display device 8. Thus, it is possible to support the safety drive at the junction. In addition, without requiring the tedious or bothersome operation to the user, the display mode can be changed at the appropriate timing. The opposite-side image capture mode for capturing the opposite side of each camera 2, 3 is implemented. Thus, the wider viewable range is made possible to provide the more effective peripheral image(s).

At this time, it is determined whether there is the visual obstacle O, which is located ahead of the junction and obstructs the view of the subject camera 2, 3 for capturing the peripheral image of the approaching road on the corresponding side of the vehicle 6 where the camera 2, 3 is located. Based on this determination, one of the above-described modes (the own-side image capture mode and the opposite-side image capture mode) is selected. Therefore, the image can be automatically captured (displayed) under the appropriate mode. The presence of the visual obstacle O is determined based on the building information, which is stored in the map database 11. Thus, the presence of the visual obstacle O can be easily sensed. Furthermore, the switching from the opposite-side image capture mode to the own-side image capture mode is carried out in such a manner that the boundary line B, which corresponds to the end of the visual obstacle O, is fixed in the predetermined position on the screen of the display device 8. Thus, the images of both of the above modes can be displayed continuously one after the other on the screen of the display device 8. Therefore, the switching of the modes can be performed without causing annoying feeling to the user.

Figure 12:
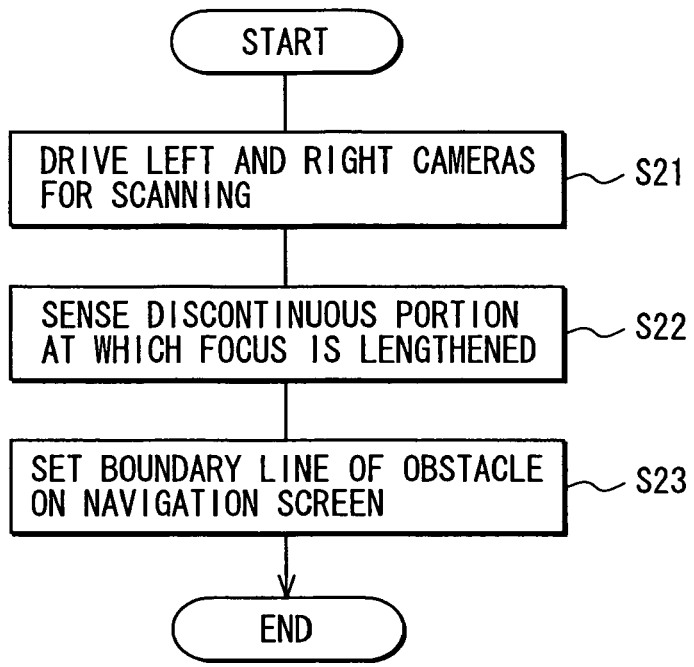
FIG. 12 is a flowchart showing a procedure for sensing a visual obstacle according to a third embodiment of the present invention.
Figure 13A:
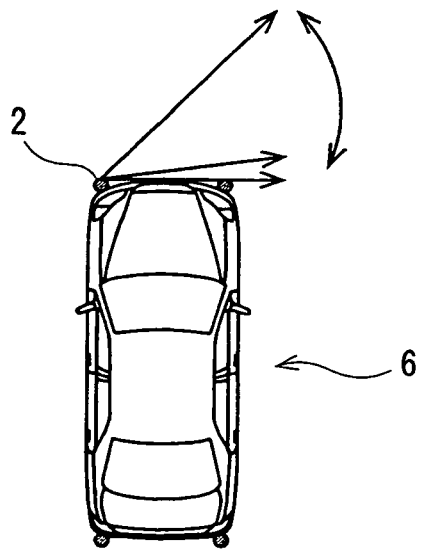
FIG. 13A is a plan view showing scanning through a front left camera according to the third embodiment.
Figure 13B:
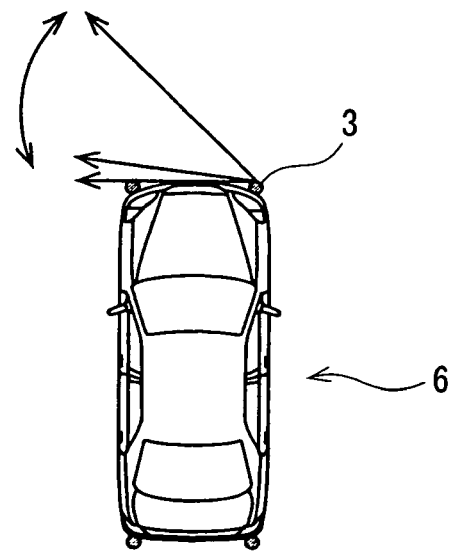
FIG. 13B is a plan view showing scanning through a front right camera according to the third embodiment.

FIGS. 12 to 13B show a third embodiment of the present invention. This embodiment differs from the second embodiment in that the presence of the visual obstacle O is sensed based on the actually captured image of the respective camera 2, 3. Specifically, a flowchart of FIG. 12 shows a procedure, which is executed by the control circuit 9 to determine presence of the visual obstacle O. First, at step S21, the front left and right cameras 2, 3 capture the images in such a manner that the front left and right cameras 2, 3 scan the front right and left sides, respectively, of the vehicle 6.

In this case, as shown in FIG. 13A, the front left camera 2 captures the image in such a manner that the front left camera 2 scans a predetermined angular range on the right side of the vehicle 6. Also, at the same time, as shown in FIG. 13B, the front right camera 3 captures the image in such a manner that the front right camera 3 scans a predetermined angular range on the left side of the vehicle 6. Here, each camera 2, 3 has an automatic focusing function. Thus, in the case where the visual obstacle O exists, the focus will be significantly changed between opposite sides of the boundary line B, which corresponds to the end of the visual obstacle O.

In the next step S22, it is determined whether there is a discontinuous portion where the focus is changed at the time of scanning of each camera 2, 3. When it is determined, i.e., it is sensed that there is the discontinuous portion, it is determined that a visual obstacle O exists. When it is determined that the visual obstacle O exists, control proceeds to step S23. At step S23, a boundary line B is set on the screen of the display device 8 in such a manner that a position of the discontinuous portion is set as an end of the visual obstacle O. Thereafter, the procedure similar to that of the second embodiment (FIG. 8) is executed.

According to the third embodiment, the advantages similar to those of the second embodiment can be achieved. In addition, the presence of the visual obstacle O is effectively sensed based on the actually captured image of the respective camera 2, 3. In other words, it is not required to include the data of the obstacle O in the map database 11, so that the amount of data can be reduced accordingly.

In the first embodiment, the front left camera 2 and the front right camera 3 are provided as the front cameras. Alternative to the front left and right cameras 2, 3 of the first embodiment, a single front camera (not shown) may be provided at a front end part or any appropriate front part of the vehicle (e.g., a front bumper, a top of a front automobile hood of the vehicle). In such a case, for example, the single front camera may be a double lens camera, which has two autofocus lenses that are oriented leftward and rightward, respectively. The left and right lenses may be rotatable about its vertical rotational axis to provide functions similar to the front left and right cameras 2, 3 of the above embodiments. Since the two lenses are integrated into a single camera body, it is easy to install such a camera to the vehicle body. Alternatively, the single front camera may have a fish-eye lens, which has an angle of view equal to or greater than 180 degrees. With this arrangement, when the vehicle approaches, for example, a junction of right-angle crossroads, a left side view and a right side view of an encountering road, which joins the current road at the junction, can be effectively captured by the single camera having the fish-eye lens. Similarly, the rear left and right cameras 4, 5 may be replaced with a single rear camera similar to the above single front camera.

In the first to third embodiments, the front left camera 2 and the front right camera 3 are provided at the front left end part and the front right end part, respectively, of the vehicle 6. However, the present invention is not limited to this configuration. For example, the front left camera 2 may be placed on a left side of a vehicle center line (a center line extending in a longitudinal direction of the vehicle) between the front left end of the vehicle and the vehicle center line, and the front right camera 3 may be placed on a right side of the vehicle center line between the front right end of the vehicle and the vehicle center line. Alternatively, both of the front left camera 2 and the front right camera 3 may be placed on the left side of the vehicle center line or may be placed on the right side of the vehicle center line. In other words, as long as the front left camera 2 is located on the left side of the front right camera 3 and is spaced from the front right camera 3, the front left camera 2 and the front right camera 3 may be placed at any front location of the vehicle.

Additional advantages and modifications will readily occur to those skilled in the art. The invention in its broader terms is therefore not limited to the specific details, representative apparatus, and illustrative examples shown and described.

What is claimed is:

1. A drive assist system for a vehicle, comprising:
   front left and right cameras that are arranged at front left and right end parts, respectively, of the vehicle to capture a corresponding peripheral image around the vehicle;
   a display device that is arranged in a passenger compartment of the vehicle and is connected with the front left and right cameras;
   a map database that stores road map information;
   a vehicle position sensing means for sensing a current position of the vehicle;
   a display control means for controlling a displaying operation of the display device based on the sensed current position of the vehicle and the road map information in such a manner that when the vehicle approaches a junction where a current road, along which the vehicle currently travels, joins an encountering road, at least one of the peripheral images of the front left and right cameras, which shows a corresponding view of the encountering road, is displayed on the display device upon satisfaction of one or more predetermined conditions; and
   a condition setting means for setting at least one of the one or more predetermined conditions, wherein
   the display control means stops the displaying of the at least one of the peripheral images of the front left and right cameras when it is determined that the sensed current position of the vehicle is in the junction.

2. The drive assist system according to claim 1, wherein the one or more predetermined conditions include at least one of a road type of the current road, a road type of the encountering road, a width of the current road, a width of the encountering road, a speed of the vehicle, and a distance from the vehicle to the approaching junction.

3. The drive assist system according to claim 1, wherein the display control means controls the displaying operation of the display device in such a manner that a right side part of a screen of the display device displays the peripheral image of a right side view on a right side of the vehicle, which is captured by one of the front left and right cameras, and a left side part of the screen of the display device displays the peripheral image of a left side view on a left side of the vehicle, which is captured by the other one of the front left and right cameras.

4. The drive assist system according to claim 1, further comprising at least one rear camera, which is arranged at a rear end of the vehicle to capture a corresponding peripheral image around the vehicle wherein when the vehicle backs up, the peripheral image, which is captured by the at least one rear camera is displayed on the display device.

5. A drive assist system for a vehicle, comprising:
   front left and right cameras that are arranged at front left and right end parts, respectively, of the vehicle to capture a corresponding peripheral image around the vehicle;
   a display device that is arranged in a passenger compartment of the vehicle and is connected with the front left and right cameras;
   a map database that stores road map information;
   a vehicle position sensing means for sensing a current position of the vehicle;
   a display control means for controlling a displaying operation of the display device based on the sensed current position of the vehicle and the road map information in such a manner that when the vehicle approaches a junction where a current road, along which the vehicle currently travels, joins an encountering road, at least one of the peripheral images of the front left and right cameras, which shows a corresponding view of the encountering road, is displayed on the display device upon satisfaction of one or more predetermined, conditions; and
   a condition setting means for setting at least one of the one or more predetermined conditions, wherein
   each of the front left and right cameras is operable in an opposite-side image capture mode for capturing the peripheral image of an opposite side view on an opposite side of the vehicle, which is opposite from a side where the camera is located.

6. The drive assist system according to claim 5, further comprising an obstacle sensing means for sensing an visual obstacle, which is present in the current road at a location before the junction and obstructs a view of the encountering road on one side of the vehicle where a corresponding one of the front left and right cameras is arranged, wherein when the obstacle sensing means senses the visual obstacle on the one side of the vehicle, an opposite one of the front left and right cameras, which is opposite from the corresponding one of the front left and right cameras, is first operated in the opposite-side image capture mode to capture the view of the encountering road on the one side of the vehicle, and thereafter each of the front left and right cameras is operated in an own-side image capture mode for capturing the peripheral image of an own side view on an own side of the vehicle where the camera is arranged.

7. The drive assist system according to claim 6, wherein the opposite one of the front left and right cameras is shifted from the opposite-side image capture mode to the own-side image capture mode while a position of a boundary line, which corresponds to an end of the visual obstacle, is fixed in a predetermined position on the screen of the display device.

8. The drive assist system according to claim 6, wherein the obstacle sensing means senses the visual obstacle based on building information stored in the map database.

9. The drive assist system according to claim 6, wherein the obstacle sensing means senses the visual obstacle based on the peripheral image captured by each camera.

10. A navigation system for a vehicle, comprising:
- at least one front camera that is arranged at a front part of the vehicle to capture a corresponding peripheral image around the vehicle;
- a display device that is arranged in a passenger compartment of the vehicle and is connected with the at least one front camera;
- a map database that stores road map information;
- a vehicle position sensing device that senses a current position of the vehicle; and
- a control unit that controls a displaying operation of the display device based on the sensed current position of the vehicle and the road map information in such a manner that when the vehicle approaches a junction where a current road, along which the vehicle currently travels, joins an encountering road, the peripheral image of the at least one front camera, which shows a corresponding view of the encountering road, is displayed on the display device upon satisfaction of one or more predetermined conditions; and
- a condition setting arrangement, through which a user sets at least one of the one or more predetermined conditions, wherein:
- the at least one camera includes front left and right cameras,
- each of the front left and right cameras is operable in an own-side image capture mode and an opposite-side image capture mode;
- in the own-side image capture mode, each of the front left and right cameras captures the peripheral image of an own side view on an own side of the vehicle where the camera is located;
- in the opposite-side image capture mode, each of the front left and right cameras captures the peripheral image of an opposite side view on an opposite side of the vehicle, which is opposite from the own side where the camera is located; and
- the control unit changes an operational mode of each of the front left and right cameras between the own-side image capture mode and the opposite-side image capture mode depending on a state of the junction.

11. The navigation system according to claim 10, wherein each of the front left and right cameras is rotatable about a vertical rotational axis.

12. The navigation system according to claim 10, wherein each of the front left and right cameras is an autofocus camera.

13. The navigation system according to claim 10, wherein an orientation of each of the front left and right cameras in the own-side image capture mode is different from an orientation of each of the front left and right cameras in the opposite-side image capture mode.

14. The navigation system according to claim 10, wherein the one or more predetermined conditions include at least one of a road type of the current road, a road type of the encountering road, a width of the current road, a width of the encountering road, a speed of the vehicle, and a distance from the vehicle to the approaching junction.

15. The navigation system according to claim 10, wherein the control unit controls the display device to stop the displaying of the peripheral image that shows the corresponding view of the encountering road when the sensed current position of the vehicle is determined to be in a center of the junction.

16. A navigation system for a vehicle, comprising:
- at least one front camera that is arranged at a front part of the vehicle to capture a corresponding peripheral image around the vehicle;
- a display device that is arranged in a passenger compartment of the vehicle and is connected with the at least one front camera;
- a map database that stores road map information;
- a vehicle position sensing device that senses a current position of the vehicle; and
- a control unit that controls a displaying operation of the display device based on the sensed current position of the vehicle and the road map information in such a manner that when the vehicle approaches a junction where a current road, along which the vehicle currently travels, joins an encountering road, the peripheral image of the at least one front camera, which shows a corresponding view of the encountering road, is displayed on the display device upon satisfaction of one or more predetermined conditions; and
- a condition setting arrangement, through which a user sets at least one of the one or more predetermined conditions, wherein the control unit controls the display device to display the peripheral image of the at least one front camera, which shows the corresponding view of the encountering road, on the display device in such a manner that the peripheral image of the at least one front camera is superimposed over a navigation road map derived from the road map information on the display device.

17. The navigation system according to claim 16, wherein the control unit controls the display device to display the current position of the vehicle on the navigation road map together with the peripheral image of the at least one front camera, which shows the corresponding view of the encountering road.

18. A drive assist system for a vehicle, comprising:
- at least one front camera that is arranged at a front part of the vehicle to capture a corresponding peripheral image around the vehicle;
- a display device that is arranged in a passenger compartment of the vehicle and is connected with the at least one front camera;
- a map database that stores road map information;
- a vehicle position sensing means for sensing a current position of the vehicle;
- a display control means for controlling a displaying operation of the display device based on the sensed current position of the vehicle and the road map information in such a manner that when the vehicle approaches a junction where a current road, along which the vehicle currently travels, joins an encountering road, at least one of the peripheral images of the at least one front camera, which shows a corresponding view of the encountering road, is displayed on the display device upon satisfaction of one or more predetermined conditions; and
- a condition setting means for setting at least one of the one or more predetermined conditions, wherein the display control means stops the displaying of the at least one of the peripheral images of the at least one front camera when it is determined that the sensed current position of the vehicle is in the junction.

* * * * *